Oct. 19, 1948.     W. UFNOWSKI     2,451,890
COLLECTION OF GASES FROM ARTIFICIAL
SILK AND THE LIKE
Filed Aug. 4, 1939     3 Sheets-Sheet 2
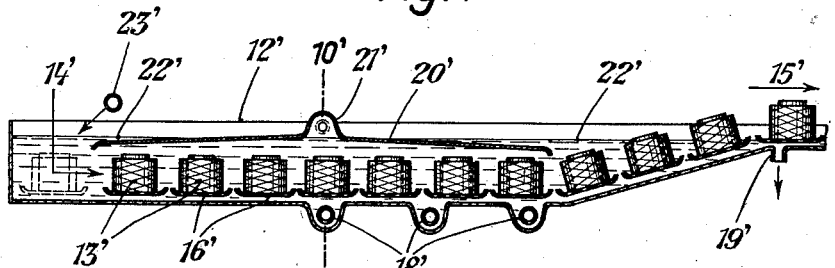
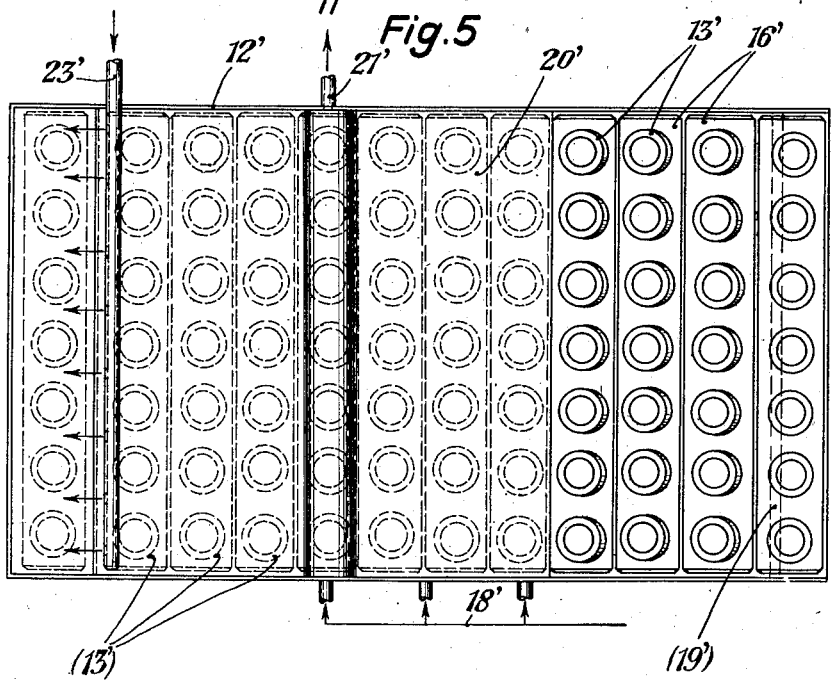
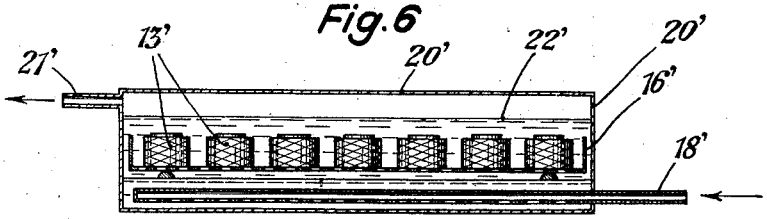
Inventor:
Wacław Ufnowski,
By Potter, Pierce & Scheffler,
Attorneys.

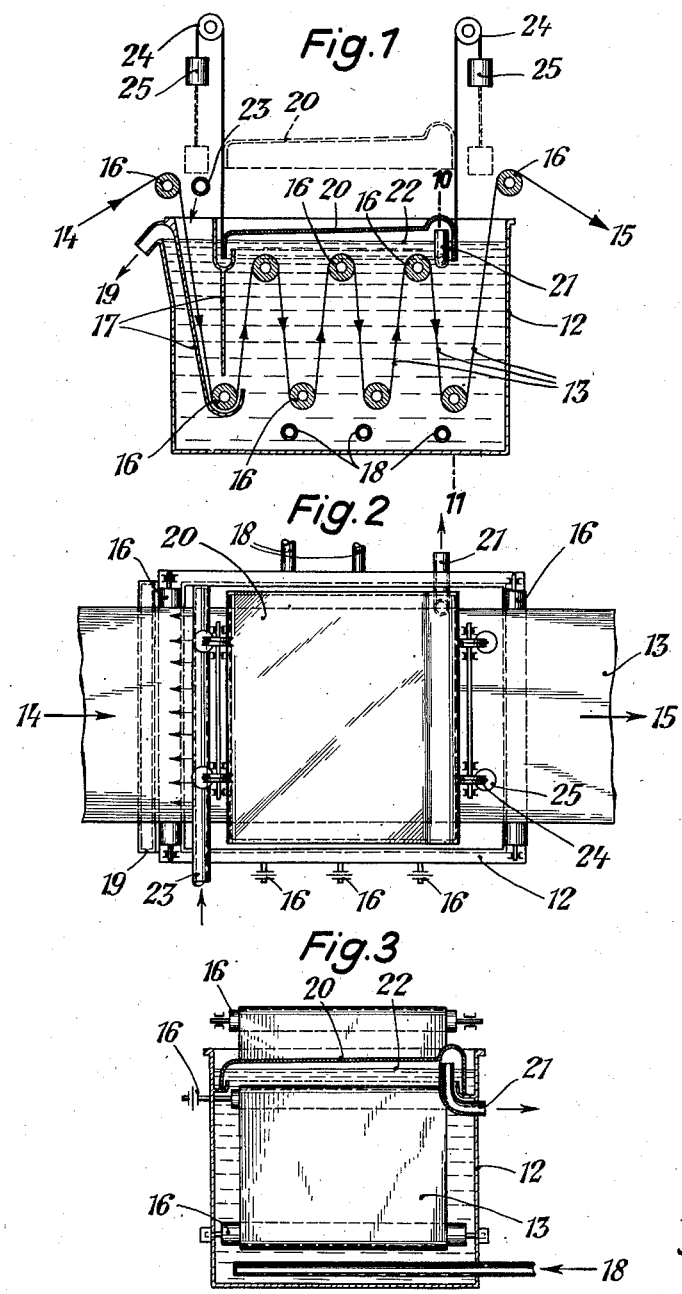

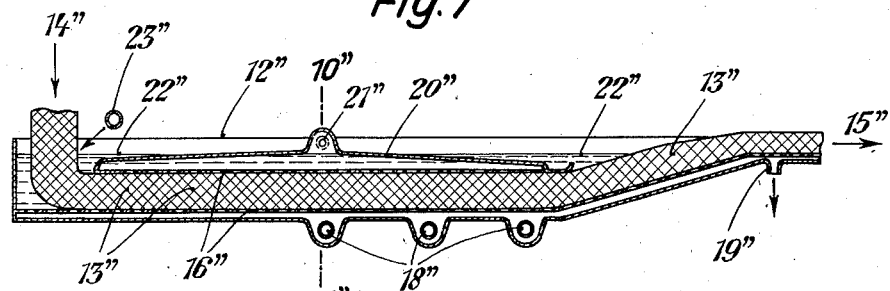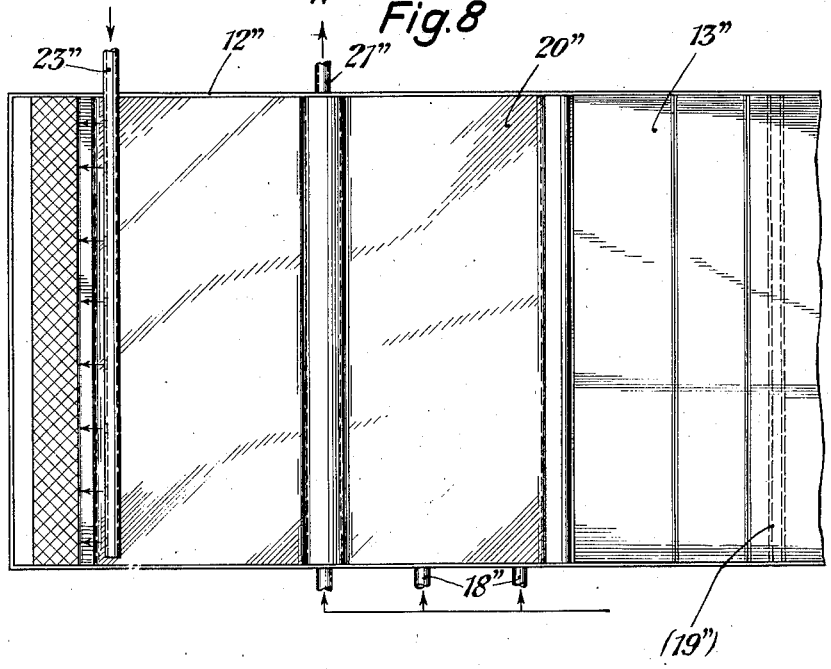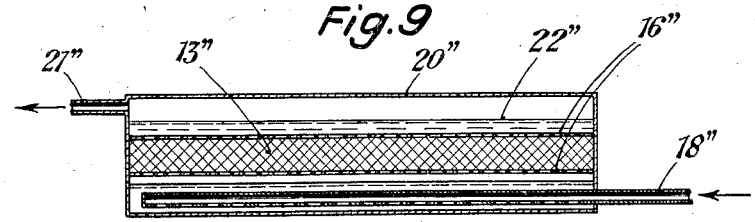

Patented Oct. 19, 1948

2,451,890

UNITED STATES PATENT OFFICE 2,451,890

COLLECTION OF GASES FROM ARTIFICIAL SILK AND THE LIKE

Waclaw Ufnowski, Warsaw, Poland

Application August 4, 1939, Serial No. 288,452
In Poland September 13, 1938

Section 3, Public Law 690, August 8, 1946
Patent expires September 13, 1958

6 Claims. (Cl. 18—8)

This invention relates to a method of and means for collecting gases, such as carbon bisulphide and hydrogen sulphide and the like from artificial silk threads in the hank, upon bobbins, staple fibres, transparent foil and the like from viscose and similar materials, for the purpose of the further utilization thereof, or for the purpose of rendering it harmless.

In the manufacture of the aforementioned products from viscose and similar materials, the coagulation and ripening are followed by the elimination of acid, which, as experience has shown, is effected most quickly by washing in hot water. This washing with hot water, however, is associated with the liberation of gases that are injurious to health, such as carbon bisulphide, hydrogen sulphide and others, which are sometimes drawn away from the surface of the bath, mixed with a large quantity of air, by the suction of a fan, and withdrawn to the outside. The gases, if discharged into the open air poison the atmosphere for a considerable distance around, and at the same time occasion a serious loss of valuable raw materials, particularly carbon bisulphide.

The abovementioned losses can be guarded against, at the same time obviating the disadvantages indicated, by employing the method and the apparatus hereinafter described for collecting the gases.

The invention is illustrated by way of example in the accompanying drawings, in which Figure 1 shows in longitudinal section one embodiment of the apparatus according to the invention for removing gases from artificial fibres in the hank, or from transparent foil;

Figure 2 is a plan view of the same apparatus, and

Figure 3 is a cross section on the line 10—11 in Figure 1;

Figure 4 shows in longitudinal section an example of the apparatus according to the invention for removing gases from threads of artificial silk made from viscose or the like, spun and wound on bobbins;

Figure 5 is a plan view of the apparatus shown in Figure 4; and

Figure 6 a cross section on the line 10′—11′ in Figure 4;

Figure 7 shows in longitudinal section an embodiment according to the invention for the removal of gases from viscose staple fibres or the like;

Figure 8 is a plan view of the apparatus shown in Figure 7, and

Figure 9 a cross section on the line 10″—11″ in Figure 7.

The removal of gases from the materials enumerated above is effected in the following sequence: In a tank 12, 12′ or 12″, filled with water, the respective materials 13, 13′ or 13″ are displaced in any convenient manner in the direction of the arrows 14, 15, 14′, 15′, 14″, 15″, upon rollers 16 in Figure 1, upon plates or tables 16′ in Figure 4, or between perforated partitions 16″ in Figure 7, underneath a bell 20, 20′ or 20″. The lower margins of the bells dip below the surface 22, 22′ or 22″ of the water in the tank 12, 12′ or 12″.

The material 13, 13′ or 13″ moves with the current of water 23, 23′ or 23″ of a fairly low temperature, in any case below 30° C., whereby premature evolution of the gases such as carbon bisulphide is prevented. To the vessel 12, in Figure 1, the admission of water from a pipe 23 is guided between two partitions 17. The material 13, 13′ or 13″ to be freed from gas is pushed forward in its further travel underneath the bell 20, 20′ or 20″ in the water, which is heated by means of direct steam or hot water supplied through pipes 18, 18′ or 18″ to the appropriate temperature, above 30° C., which is necessary for the evolution of the gases. The gases separated from the material 13, 13′ or 13″ under treatment escape in an upward direction, and are collected underneath the bell cover 20, 20′ or 20″, whence they are guided by their own pressure through a pipe 21, 21′ or 21″, without being mixed with air, to cooling means for the purpose of condensing the carbon bisulphide, the residual hydrogen sulphide either being worked up into sulphuric acid or being oxidised to sulphur, or else neutralized with waste lye.

The water from inlets 23, 23′ or 23″ and 18, 18′ or 18″ has an overflow at 19, 19′ or 19″. The influx of fresh water is necessary, because part of the water is carried away with the material 13, 13′ or 13″ to be treated, and the water remaining in the vessel 12, 12′ or 12″, without any influx of fresh water, might attain a degree of acidification, which would be injurious to the material under treatment.

The bell cover 20 may in case of need be raised by means of pulleys 24, with counter-weights 25, as shown in Figures 1 and 2, or may be integral with the vessel 12′ or 12″, as shown in Figures 4 to 9.

The material freed from gas in the manner described above admits of being treated much more easily during the further operations, such as freeing from sulphur, bleaching and so forth, and also admits of being much better dyed.

Having now particularly described and ascertained the nature of my said invention and in what manner the same is to be performed, I declare that what I claim is:

1. A method of recovering gases and vaporizable constituents from artificial cellulosic material which comprises providing a water bath having a cold zone and an adjacent heated zone, passing the material continuously into the cold zone, passing said material continuously from the cold zone through the adjacent heated zone, and passing said material out of said water bath and collecting the gases coming to the surface of the heated zone out of contact with the air.

2. A method of recovering gases and vaporizable constituents from artificial cellulosic material which comprises providing a water bath having a cold zone at one end and an adjacent heated zone, passing the cellulosic material continuously into the cold zone, passing said material continuously through the adjacent heated zone, passing said material continuously out of the water bath, passing cold water continuously into the cold zone to maintain said material at a low temperature until it reaches the hot zone, and collecting the gases and vapors liberated in the hot zone at the surface thereof out of contact with the air.

3. Apparatus for recovering gases and vaporizable constituents from artificial cellulosic material which comprises a water tank having a cold zone and a heated zone, a hood extending over the heated zone of said tank with its lower edges dipping below the surface of the water in said tank, means for passing the cellulosic material to be treated continuously into the cold zone of said tank, through the heated zone under said hood and out of the tank, means for introducing cold water at the entrance end of the tank to maintain a cold zone therein, means for heating the heated zone of the tank, and a pipe for withdrawing gases from the hood.

4. Apparatus as claimed in claim 3 wherein the means for passing the cellulosic material through the tank comprises guide rollers.

5. Apparatus as claimed in claim 3 wherein the means for passing the cellulosic material through the tank comprises a perforated support movable through said tank.

6. Apparatus for recovering gases and vaporizable constituents from artificial cellulosic material which comprises a water tank, means comprising a substantially vertical partition spaced from one end wall of the tank and terminating short of the bottom of the tank to define an entrance passageway, means for introducing cold water into said entrance passageway, means beyond said entrance passageway for heating the water beyond said passageway, a hood extending above the heated zone of said tank with its lower edges dipping below the surface of the water in said tank, means for passing the cellulosic material continuously into the entrance passageway, through the heated zone under the hood, and out of said tank, and a pipe for withdrawing gases from the hood.

WACŁAW UFNOWSKI.

REFERENCES CITED

The following references are of record in the file of this patent:

UNITED STATES PATENTS

| Number | Name | Date |
|---|---|---|
| 1,954,649 | Rusch | Apr. 10, 1934 |
| 2,042,016 | Moritz et al. | May 26, 1936 |

FOREIGN PATENTS

| Number | Country | Date |
|---|---|---|
| 357,470 | Great Britain | Sept. 24, 1931 |
| 359,685 | Germany | Sept. 30, 1922 |
| 455,534 | Great Britain | Oct. 22, 1936 |